(12) United States Patent
Rodriguez et al.

(10) Patent No.: US 6,325,753 B1
(45) Date of Patent: *Dec. 4, 2001

(54) METHOD AND APPARATUS FOR TREATMENT OF SEDIMENT

(75) Inventors: José E. Rodriguez, Union, NJ (US); Howard M. Citron, South Salem, NY (US); Richard C. Colarusso, Marlboro, NJ (US); Larry A. Vetter, Smithtown, NY (US); Brian Kalab, Everett, WA (US)

(73) Assignees: Bell Atlantic Network Services, White Plains; Environmental Products & Services, Inc., Syracuse, both of NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/689,832

(22) Filed: Aug. 15, 1996

(51) Int. Cl.[7] ............................... A62D 3/00; B09C 1/08; C02F 11/14
(52) U.S. Cl. ................... 588/256; 37/195; 210/241; 405/128; 588/259; 588/900
(58) Field of Search .................... 588/249, 252, 588/256, 259, 900; 37/195, 317, 905; 210/241; 405/128, 129

(56) References Cited

U.S. PATENT DOCUMENTS

| 567,312 | 9/1896 | Goodale et al. |
| 673,868 | 5/1901 | Henderson . |
| 948,785 | 2/1910 | Lajoie . |
| 1,698,537 | 1/1929 | Cushwa . |
| 3,893,656 | 7/1975 | Opacic et al. .................... 210/199 X |
| 4,113,504 | * 9/1978 | Chen et al. ....................... 588/256 X |
| 4,160,734 | * 7/1979 | Taylor et al. .................... 210/241 X |
| 4,338,191 | 7/1982 | Jordan .................................. 210/199 |
| 4,501,446 | * 2/1985 | Glaser et al. ........................ 37/195 X |
| 4,543,183 | * 9/1985 | Petretti ............................. 210/241 X |
| 4,600,514 | * 7/1986 | Conner .............................. 588/256 X |
| 4,855,064 | 8/1989 | Schlein ................................ 210/764 |
| 5,156,823 | 10/1992 | Hori et al. ..................... 210/198.1 X |
| 5,238,582 | 8/1993 | Hori et al. ........................... 210/749 |
| 5,295,317 | * 3/1994 | Perrott ................................. 37/905 X |
| 5,312,551 | * 5/1994 | Perron et al. .................... 210/241 X |
| 5,350,511 | 9/1994 | Sakurada ............................... 210/199 |
| 5,419,839 | * 5/1995 | Haley et al. .......................... 405/128 |
| 5,425,188 | * 6/1995 | Rinker ..................................... 37/317 |
| 5,453,203 | 9/1995 | Higuchi ................................. 210/696 |
| 5,512,702 | * 4/1996 | Ryan et al. ........................... 588/256 |
| 5,938,936 | * 8/1999 | Hodges et al. ...................... 37/195 X |

* cited by examiner

Primary Examiner—George Suchfield
(74) Attorney, Agent, or Firm—Robin, Blecker & Daley

(57) ABSTRACT

A method and apparatus is disclosed which comprises a portable treatment method and apparatus for treating sediment and other waste material. A preselected solid composition is added to the sediment as it is drawn through a system which mixes the sediment and composition thoroughly to produce a homogenous mixture, which is then in turn deposited in a storage device for eventual removal from the site.

14 Claims, 3 Drawing Sheets

METHOD AND APPARATUS FOR TREATMENT OF SEDIMENT

The present invention relates to the treatment of sediment. More particularly, the present invention relates to a method and apparatus for stabilizing undesirable material during the course of sediment removal.

BACKGROUND OF THE INVENTION

It is known in the art to remove sediment and other material from mines and other areas. The methods and/or apparatuses used to accomplish those tasks are usually permanent installations designed to recirculate water, or to purify it for direct removal to the environment as in pumping the treated water to a stream located near the installation or the like.

These permanent types of installations are, of course unwieldy and not easily transportable from site to site, if desired. Moreover, the need to purify the sludge or other material so that it can be recirculated or removed directly from the environment has led to rather complicated installations which may be not be necessary if simple neutralization undesired materials, such as heavy metals, is desired.

SUMMARY OF THE INVENTION

The present invention provides a method and apparatus for the treatment of unwanted material in an environmentally sound and effective manner. Embodiments of the present invention include treatment of the undesired material by solid chemical means, which ensures the stabilization of various undesired material, especially heavy metals, and particularly lead. Embodiments of the present invention are especially useful in the removal and disposal of sediment which may occur in a sewer or underground electrical or telephone system. Moreover, the portability of the present invention means that it can be transported from area to area in which removal is desired.

The treatment occurs through mixing of the sludge and solid chemical means so that a homogenous treated mixture is obtained. This homogeneity means that through use of the method and/or apparatus of the present invention, treatment of the undesired material has been thorough enough to ensure consistent sampling results of the mixture, reflecting effective stabilization of the undesirable materials.

DETAILED DESCRIPTION OF THE PREFERRED EMBODIMENTS

Figure 1:
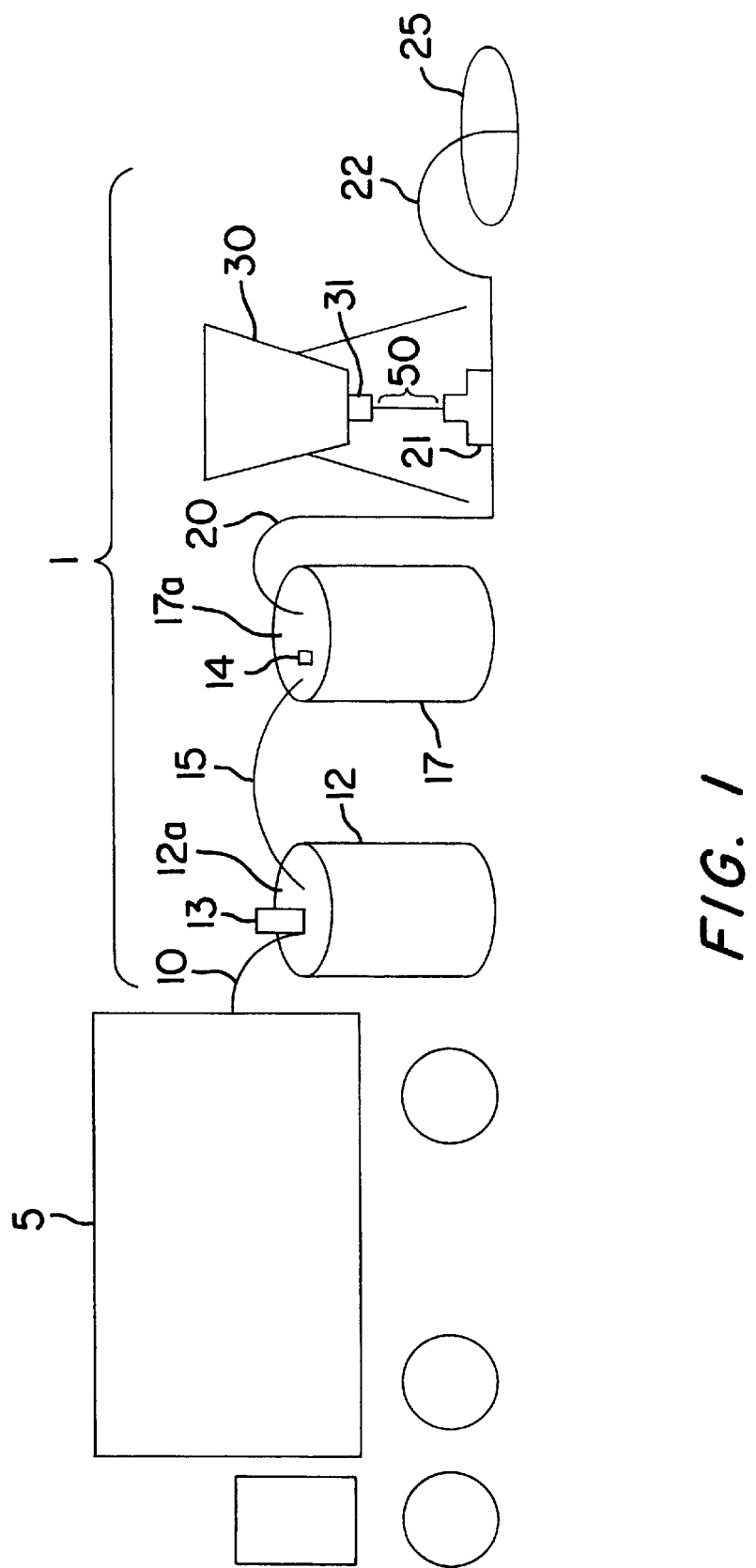
FIG. 1 is a view of a preferred embodiment.

A preferred embodiment of the present invention is shown in FIG. 1. This embodiment is used for the removal and treatment of sediment that occurs below streets, in pipes or conduits used for electrical or telephone wires.

Removal of this sediment is difficult because it often contains environmentally unsound quantities of heavy metals, especially lead, yet removal is necessary because, inter alia, the sediment will hamper access to the wires carried in the conduits, which access is necessary for maintenance and the like.

In this embodiment, a vacuum truck 5 is used, specifically a CUSCO TURBO VAC vacuum truck or PRESSVAC WET/DRY VAC vacuum truck, to provide at least 2600 c.f.m. of air as the motive force. The vacuum is created along the hose and tank system shown generally at 1, comprised of hose 10, through tank 12 with lid 12a, along hose 15, through tank 17 with lid 17a, and through hose 20, tee fitting 21 and hose 22. In this embodiment the hoses may be of variable diameter, so that for example hose 10 is a 6" hose, comprised of steel reinforced rubber, while hoses 15, 20 and 22 are 4" in diameter and comprised of similar material to hose 10. Of course, any material known in the art sufficient to withstand the vacuum may be used, so long as it has sufficiently strong walls to resist collapsing when the vacuum is induced through the hose. The tanks 12 and 17 and their associated lids 12a and 17a are 55 gallon drums made of steel, of the type commonly seen used for transporting chemicals and the like. The lids, although modified as set forth herein, are otherwise the type of lid commonly associated with a 55 gallon drum.

Returning now to FIG. 1, hose 22 passes through manhole 25, and, at the terminus of hose 22, an individual is responsible for locating the hose nozzle, in a manner not shown, to the areas of sediment desired to be removed in a conduit. The individual will move the nozzle manually in order to pull the sludge up through the nozzle as desired. Pressure relief valve 13, mounted on lid 12a, keeps the system at or close to a maximum, constant vacuum about 10 in. Hg. which will keep the drums from imploding under the vacuum. The general range during the operation of this embodiment will vary from 0 to 10 in. Hg. depending on the composition of the sediment removed from the conduit area. Thicker sludge will be drawn through the system at a lower pace and thinner sediment at a higher pace.

Figure 2:
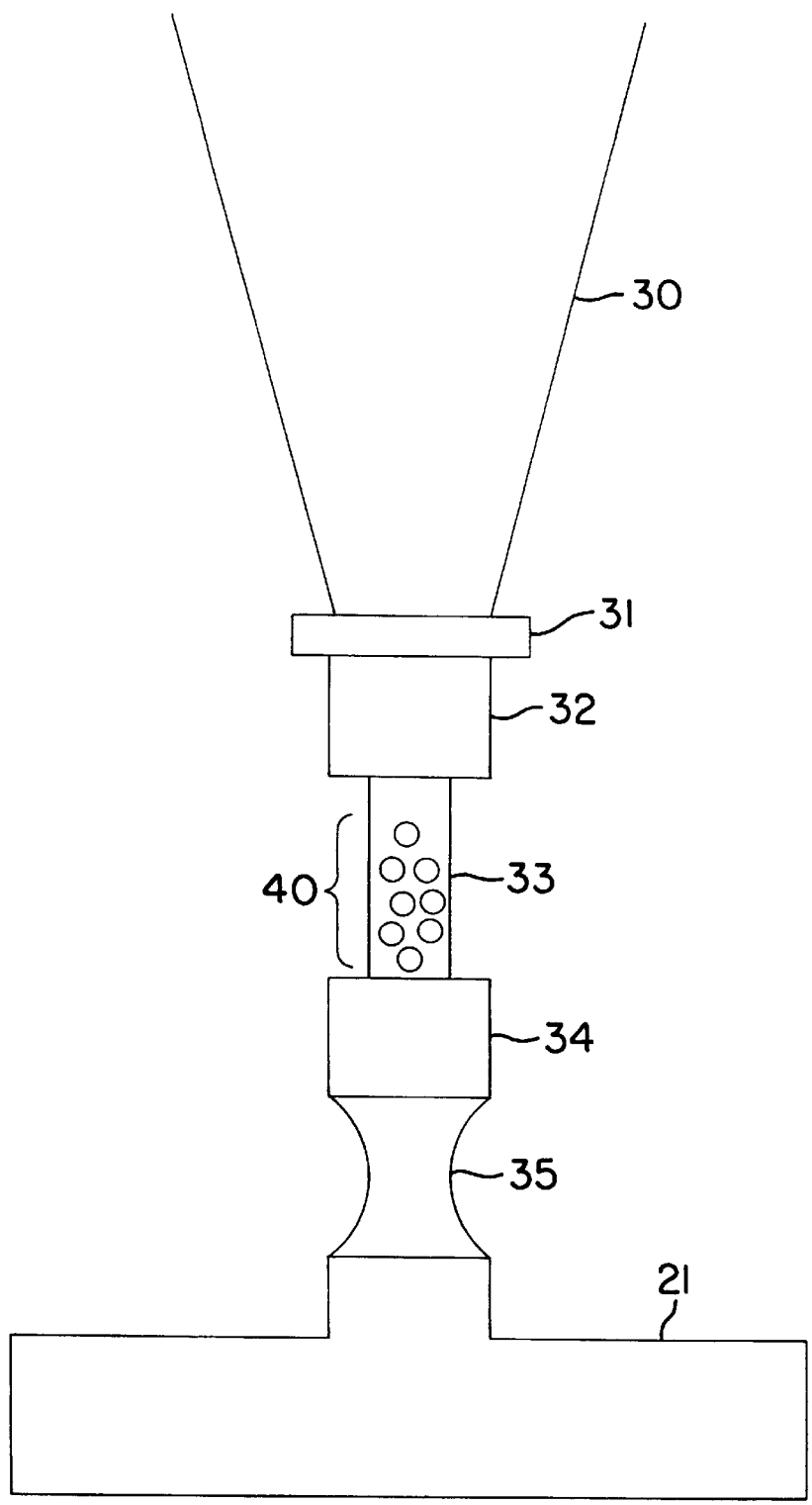
FIG. 2 is a view of a section of a preferred embodiment.

Also connected to the hose system 1, via tee fitting 21, is hopper 30, regulator 31 and supply area 50. Turning now to FIG. 2, where this region is shown in greater detail, regulator 31 is connected to the bottom of the hopper 30, through a collar (not shown) and screw or glue attachments in a manner known in the art and is used in a manner as described below. To the other end of regulator 31 is connected again by way of a collar (not shown) and a screw attachment to an upper cam lock fitting 32. This fitting is then connected to a vacuum fitting 33, by way of clamping in manner known in the art and not shown. At the other end of vacuum fitting 33 is lower cam lock fitting 34, which in turn is connected to venturi fitting 35, and tee fitting 21. Components 31, 32, 33, 34, 35 and tee fitting 21 are comprised of PVC, and are commonly known and available.

In operation, the hopper 30, which in this embodiment has a 30 gallon capacity, is loaded with the treatment composition. In this embodiment the composition known as "ENVIROBLEND ore", which is a calcined magnesite mineral ore, manufactured by American Minerals, New Castle, Del., is used. It passes through the regulator 31, and supply area 50, and thereby into the tee fitting 21 and the sludge. Mixing then occurs and the lead leachate is decreased to environmentally sound levels.

The holes shown generally at 40 in vacuum fitting 33 provide means for regulating the effect of the vacuum on drawing the composition in hopper 30 through the system. For example, if the composition is found to have a tendency to "clump" the vacuum can be strengthened and thereby increase the draw down ability of the composition by covering the various holes seen generally at 40, in the fitting 33. Any method known in the art can be used to cover the holes in various patterns, and in a preferred embodiment ordinary tape of they type known as duct tape is used. Hopper 30 is open to the ambient air in order that the composition is not rapidly drawn into the system. Of course, any method known in the art to control the flow of the composition, which may be vacuum dependent as shown in this embodiment, or which may not, may be used.

The lower cam lock fitting 34 is reduced via successively smaller fittings, shown generally at 35, to a desired width, which will also serve to regulate the speed at which the composition is transferred to the waste sediment. Alternatively, regulation of the speed can occur by any manner known in the art, so, for example, another regulator, allowing for variable width passageways could be installed here.

Returning now to FIG. 1, the general path of the sediment through the system begins with its entry into the hose terminus of hose 22. It then travels through tee fitting 21, where it is mixed with the composition. This mixing occurs throughout hose 20, and into tank 17.

The ENVIROBLEND composition used in this embodiment will stabilize lead, and result in a homogenous mixture ultimately residing in tank 17. Once tank 17 is filled with this mixture, the vacuum is then shut off, tank 17 disconnected from lid 17a, and removed for further disposal. A new tank is moved into its place, and the vacuum turned on again. The process continues, filling tanks sequentially, until the desired amount of sediment is stabilized. Of course in other embodiments with smaller amounts of sediment only one tank 17, or less than one tank, may be filled.

The composition in this embodiment stabilizes the heavy materials, specifically lead by, it is believed, encapsulating them and preventing their leaching through the sediment. Any disposal without treatment of the heavy metals, or lead in this embodiment, would prevent safe environmental disposal. According to various tests on the sediment conducted in accordance with the embodiment set forth above, it is rendered environmentally safe, that is, leachable lead is present at a concentration of below 5 parts per million (ppm) after treatment, while before treatment the sediment had lead present in much higher concentrations, as high as 200 ppm or possibly higher. Of course in other embodiments, other compositions may be utilized to stabilize the heavy metals, or other undesirable elements in the sediment by way of substitution in the hopper 30, a mixture of compositions in the hopper or by way of more than one hopper. Virtually any type of powdered solid that could treat a palpable waste stream could be used. For example, soda ash could be used to neutralize undesired acids if so desired.

Figure 3:
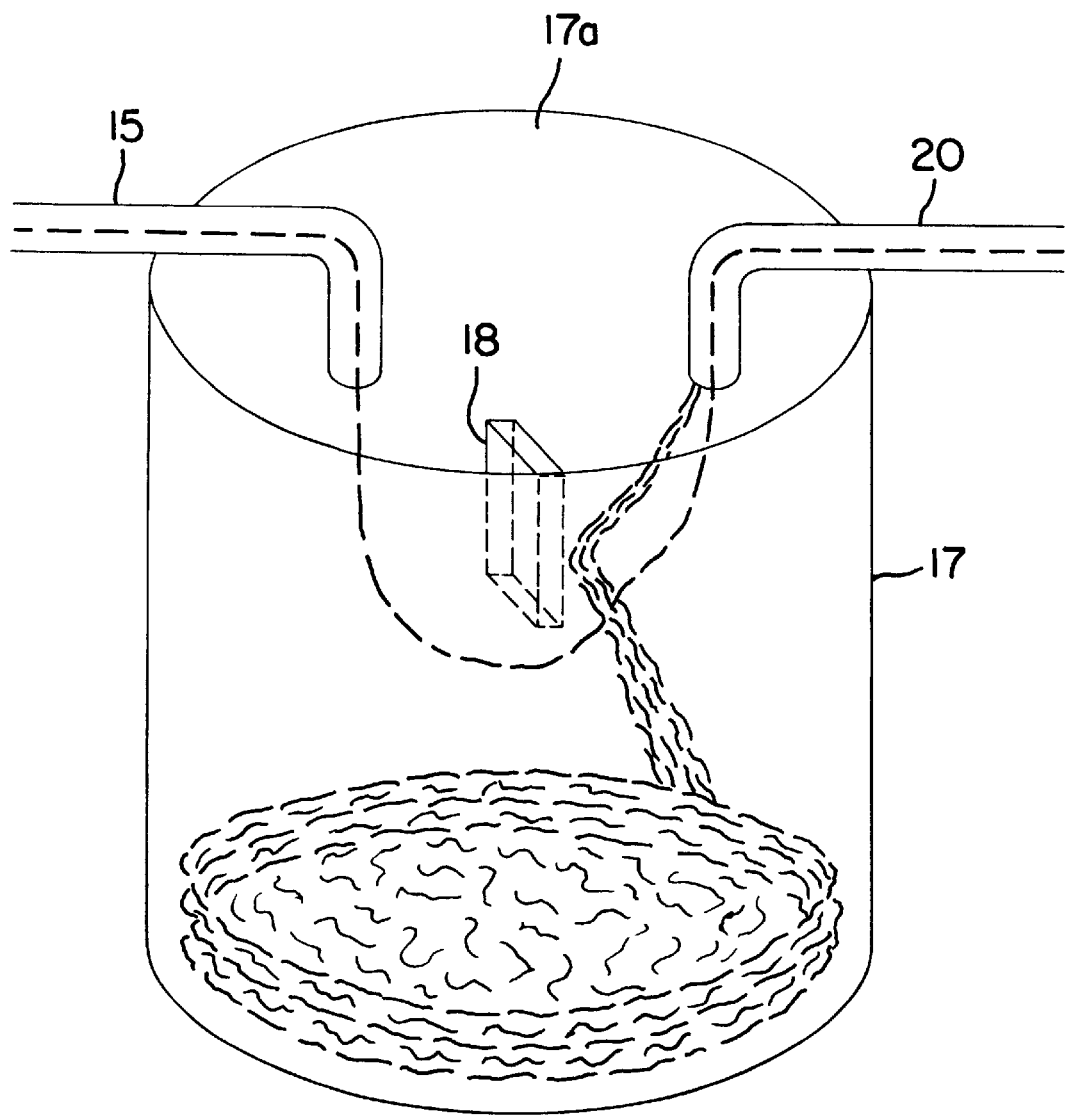
FIG. 3 is a view of a section of a preferred embodiment.

In this embodiment tank 17 is used to store the treated sediment. In that tank it has been trapped and usually does not travel further into tank 12. This is because, as is seen in FIG. 3, the mixed sediment and composition will hit the baffle 18, made of steel and attached to the side of tank 17 by welding, as it is being drawn into the tank, which will cause the mixture to drop to the bottom of the tank.

Returning now to FIG. 1, tank 12 will function as an overflow tank for the treated sediment if necessary. This may be the case wherein the mixture has a high water content and will blow by the baffle 18 in tank 17, by way of the vacuum flow shown in phantom in FIG. 3. Usually the amount of liquid accumulating in tank 12 is small, if any does accumulate. For example, it has been noted in specific uses of this embodiment that as little as ¼ to 1 inch of material will accumulate in the bottom of tank 12, for every 2 to 4 filling of tank 17. Thus, it should be noted that in other embodiments it is not necessary and may not be desired for tank 12 to be present.

It may be desired have a fill indicator 14 on lid 17a, in order to signal when tank 17 is becoming filled and the system should be shut off in order to remove it.

Other embodiments concern the supply area from the hopper, shown generally in FIG. 1 as 50 and the hopper 30. In these embodiments, there is a continuous supply of the composition retained in hopper 30, by for example, providing a larger hopper, or having a supply truck feed the material at a desired rate of feed into the system through a modified tee fitting. In yet other embodiments, supply area 50 can be comprised of a variable administration mechanism as known in the art, so that the rate of and/or amount of the composition may be modified as desired. Also as noted above it may be desired to mix the sediment through a number of hoppers or feeder mechanisms with any number of compositions placed into the system, as long as provision is made for adequate mixing before placement into the storage tank or tanks.

Moreover, mixing of the sediment and chemical may desirably occur anywhere in the system, so long as it is introduced sufficiently, in order to assure stabilization of the sediment material. The mix achieved by the present invention is a homogenous mix, that is the sediment and stabilization agent provide an evenly dispersed mix so that any sampling of the mix at any point after the mixing will reveal safe levels of undesired materials.

It is important to note that the present invention, is portable and transportable from job site to job site, wherever removal of waste material and treatment of same is desired.

Of course below grounds removal and treatment is not the only type of situation where the present invention may be used advantageously. For example above ground environmentally unsound spills can be removed and treated according to other embodiments of the present invention.

Mixing volumes can be varied in any manner desired as long as the mixing occurs sufficiently to reach whatever parameters of homogenous stabilization are desired. The volumes in the preferred embodiment shown in FIG. 1 mix the composition in this embodiment with the sediment in a roughly nine to one ratio: that is, approximately 50 pounds of ENVIROBLEND is used for every 450 pounds of sludge, resulting in a 500 pound filled drum. A range of between 5 percent of composition to 20 percent of composition can be used throughout the system, but the present approximately 10 percent range has been found to best balance a safe, homogenous mixture with an economical amount of blend.

The source of vacuum can be with any number of means known in the art. In the sediment treated as shown the embodiment as shown in FIG. 1, it is necessary that it be of sufficient force to pull the sludge through the hose system 1. Other materials, treated by other embodiments, may require more or less vacuum pressure, as determined by the viscosity of the materials to be treated. If the material to be treated is of widely varying viscosity it may of course be possible to vary the vacuum pressure if desired.

It also may be desirable to add water to the sludge, in a quantity determined by the viscosity of the sediment, before removal and treatment. The amount of water will vary by the viscosity of the sediment, so that for example, sediment which is very thick in its native environment, and essentially solid will have water added, by hose or other means, in order to facilitate removal by the hose terminus.

The above description and the views and material depicted by the figures are for purposes of illustration only and are not intended to be, and should not be construed as, limitations on the invention.

Moreover, certain modifications or alternatives may suggest themselves to those skilled in the art upon reading of this specification, all of which are intended to be within the spirit and scope of the present invention as defined in the attached claims.

What is claimed is:

1. A method for treating sediment or other waste material comprising:

removing the sediment using a vacuum;

supplying a preselected solid composition to the sediment;

mixing the sediment with the preselected composition in order to achieve a homogeneous mixture; and storing the homogeneous mixture in a removable tank.

2. A method for treating sediment as in claim 1 where the step of removing the sediment using a vacuum further comprises using a portable vacuum device.

3. A method for treating sediment as in claim 2 where the step of removing the sediment further comprises using a truck mounted portable vacuum generation device.

4. A method for treating sediment as in claim 1 where the step of removing the sediment using a vacuum comprises the further step of using a hose having a terminal end.

5. A method for treating sediment as in claim 4 where the step of removing the sediment further comprises using the said hose manually.

6. A method for treating sediment as in claim 1 where the step of supplying a preselected solid composition to the sediment further comprises using a composition that stabilizes heavy metals.

7. A method for treating sediment as in claim 6 where the step of supplying a preselected solid composition to the sediment further comprises using a composition that stabilizes lead.

8. A method for treating sediment as in claim 1 where the step of supplying a preselected solid composition to the sediment further comprises using a flow control mechanism for the preselected composition.

9. A method for treating sediment as in claim 8 where the step of supplying a preselected solid composition to the sediment further comprises using a variable flow control mechanism.

10. A method for treating sediment as in claim 9 where the step of supplying a preselected solid composition to the sediment further comprises using a manually operated flow control mechanism.

11. A method for treating sediment as in claim 1 where the step of removing the sediment comprises providing a flow path from the location of the sediment to the source of said vacuum, the step of mixing the sediment with the preselected solid composition further comprises introducing the composition to the sediment at a point along the flow path so that the sediment and composition flow together and are mixed to result in the homogeneous mixture as they are pulled along the flow path by the vacuum, and the step of storing comprises situating the removable storage tank along the flow path to receive the homogeneous mixture.

12. A method for treating sediment as in claim 1 where the removable tank is a 55 gallon drum.

13. A method for treating sediment as in claim 1 where said removable tank has a fill indicator.

14. An apparatus for treating sediment or other waste material which comprises:

a vacuum unit;

a flow path disposed between said vacuum unit and said sediment and along which said sediment travels when drawn by the vacuum created by said vacuum unit;

a supply unit which supplies a preselected solid composition to the sediment in the flow path so that the sediment and the preselected composition are mixed in order to achieve a homogeneous mixture; and a removable tank situated along the flow path which collects and stores the homogeneous mixture.

* * * * *